(12) United States Patent
Hepburn et al.

(10) Patent No.: US 8,506,912 B1
(45) Date of Patent: Aug. 13, 2013

(54) EXHAUST TREATMENT SYSTEM INCLUDING A NICKEL-BASED CATALYST

(75) Inventors: Jeffrey Scott Hepburn, Birmingham, MI (US); Hungwen Jen, Troy, MI (US); Eva Thanasiu, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/367,692

(22) Filed: Feb. 7, 2012

(51) Int. Cl.
*B01D 53/94* (2006.01)
*B01J 23/755* (2006.01)
*B01J 32/00* (2006.01)
*F01N 3/10* (2006.01)
*F01N 3/28* (2006.01)

(52) U.S. Cl.
USPC ............. 423/213.2; 423/213.5; 502/325; 502/337; 502/349; 502/340; 502/302; 502/319; 502/324; 502/345; 60/299

(58) Field of Classification Search
USPC .............. 423/213.2, 213.5; 502/325, 337, 502/349, 340, 302, 319, 324, 345; 60/299
See application file for complete search history.

(56) References Cited

U.S. PATENT DOCUMENTS

| | | | | |
|---|---|---|---|---|
| 3,098,829 A | * | 7/1963 | Aitken et al. | 502/252 |
| 3,985,683 A | | 10/1976 | Stenzel | |
| 4,006,103 A | * | 2/1977 | Meguerian et al. | 502/200 |
| 4,012,485 A | * | 3/1977 | Meguerian et al. | 423/213.5 |
| 4,111,849 A | * | 9/1978 | Fedor | 502/315 |
| 4,654,319 A | * | 3/1987 | Kim et al. | 502/304 |
| 5,534,475 A | | 7/1996 | Miramontes Cardenas et al. | |
| 5,688,740 A | | 11/1997 | Bolshakov et al. | |
| 5,795,553 A | | 8/1998 | Lott et al. | |
| 6,143,261 A | | 11/2000 | Lissy et al. | |
| 6,841,512 B1 | * | 1/2005 | Fetcenko et al. | 502/335 |
| 6,887,438 B2 | | 5/2005 | Labarge et al. | |
| 7,758,834 B2 | | 7/2010 | Chen et al. | |
| 2007/0166826 A1 | | 7/2007 | Stockwell | |
| 2011/0056269 A1 | | 3/2011 | Odendall et al. | |

FOREIGN PATENT DOCUMENTS

JP 1139144 A 5/1989

OTHER PUBLICATIONS

Loof et al., "Oxygen storage capacity of noble metal car exhaust catalysts containing nickel and cerium", ScienceDirect, Journal of Catalysis, vol. 118, Issue 2, Aug. 1989, pp. 339-348.
El-Shobaky et al., "Nickel cuprate supported on cordierite as an active catalyst for CO oxidation by O2", ScienceDirect, Applied Catalysis B: Environmental, vol. 63, Issues 3-4, Mar. 31, 2006, pp. 168-177.
Villegas et al., "Wet impregnation of alumina-washcoated monoliths: Effect of the drying procedure on Ni distribution and on autothermal reforming activity", ScienceDirect, Applied Catalysis A: General, vol. 320, Mar. 22, 2007, pp. 43-55.

* cited by examiner

*Primary Examiner* — Timothy Vanoy
(74) *Attorney, Agent, or Firm* — Dinsmore & Shohl LLP

(57) ABSTRACT

A nickel-based catalyst is provided for reducing carbon monoxide, hydrocarbon emissions, and nitrogen oxides from vehicle exhausts. The catalyst is impregnated directly onto a carrier which is non-reactive with nickel. The nickel is contained on said carrier at a loading of between about 2 to about 20 wt %. When used in a vehicle exhaust gas treatment system, the catalyst provides improved efficiency in reducing CO, HC, and $NO_x$ emissions over the use of conventional three-way-catalysts.

25 Claims, 6 Drawing Sheets

EXHAUST TREATMENT SYSTEM INCLUDING A NICKEL-BASED CATALYST

BACKGROUND OF THE INVENTION

Embodiments described herein relate to the preparation and use of nickel-based catalysts in reducing carbon monoxide, hydrocarbon emissions, and nitrogen oxides ($NO_x$) from vehicle exhausts, and more particularly, to a nickel-based catalyst used in a vehicle aftertreatment system to provide supplemental oxygen storage capacity for the oxidation of carbon monoxide and hydrocarbons, and the reduction of nitrogen oxides.

In recent years, government regulations in the United States have restricted emissions of carbon monoxide (CO), hydrocarbons (HC) and nitrogen oxides ($NO_x$) from vehicle engine exhausts. This has necessitated the use of catalysts in gasoline-powered vehicles which function to stimulate the oxidation reaction of HC and CO and the reduction of $NO_x$. Such catalysts are typically referred to as three-way conversion (TWC) catalysts because they simultaneously oxidize CO and HC to $CO_2$ and water while reducing $NO_x$ to nitrogen. Three-way conversion catalysts often include materials with oxygen storage capacity (OSC), i.e., materials which provide additional oxygen needed to oxidize carbon monoxide and hydrocarbons in the exhaust at rich air/fuel ratios. During subsequent lean air/fuel operations, the excess oxygen in the exhaust then replenishes the depleted oxygen of the OSC materials used in the previous rich operations, which enhances the overall reduction of $NO_x$ in the exhaust stream.

Currently, OSC materials typically comprise cerium-based oxides such as cerium oxide ($CeO_2$), cerium-zirconium mixed oxides ($Ce_xZr_yO_2$), and cerium-praseodymium mixed oxides ($Ce_xPr_yO_2$). However, in some vehicle operations with long and rich air/fuel excursions, conventional cerium-based oxides do not generate sufficient amounts of oxygen needed for the oxidation of HC and CO.

Accordingly, there is a need in the art for a catalyst which provides an oxygen storage capacity to meet the demand for oxygen in the reduction of carbon monoxide, hydrocarbon emissions, and nitrogen oxides from a vehicle exhaust.

SUMMARY OF THE INVENTION

Embodiments of the invention meet those needs by providing a nickel-based catalyst which provides supplemental oxygen storage capacity for the oxidation of carbon monoxide and hydrocarbons during lean-to-rich transitions as well as the reduction of nitrogen oxides during rich-to-lean transitions. The nickel-based catalyst also provides removal of carbon monoxide and hydrocarbons via catalytic water-gas-shift (WGS) and steam-reforming operations after the depletion of oxygen storage capacity.

According to one aspect of the invention, a catalyst for reducing carbon monoxide and hydrocarbon emissions from a vehicle exhaust is provided which comprises a nickel-based catalyst deposited directly onto a carrier, wherein the carrier is non-reactive to nickel. By "non-reactive to nickel," it is meant that the carrier contains no materials such as any transition alumina which could adversely react with the nickel to form nickel aluminate and reduce its function or cause deactivation of the nickel catalyst.

The carrier preferably comprises a material selected from the group consisting of zirconium oxide, cordierite, silicon carbide, silica gel, and non-reactive alumina. By "non-reactive alumina," it is meant a type of alumina such as delta alumina which will not react negatively with nickel to reduce its function. The carrier may be in the form of a honeycomb substrate or in the form of powders. Where the carrier is in the form of a honeycomb substrate, the nickel is directly loaded onto the honeycomb. In embodiments where the carrier is in the form of powders, nickel-loaded carrier powders can be washcoated onto a ceramic or metallic honeycomb.

The nickel-based catalyst is contained on the carrier at a loading of between about 2 to about 20 wt %, and preferably, at a loading of between about 8 to about 15 wt %.

In one embodiment, the catalyst further includes a three-way catalyst provided as a separate layer over the nickel-based catalyst. The three-way catalyst preferably includes a precious metal selected from the group consisting of platinum, palladium, or rhodium. In one embodiment, the three-way catalyst further includes a catalyst promoter selected from zirconium oxide, cerium oxide, aluminum oxide, praseodymium oxide, lanthanum oxide, and barium oxide.

In one embodiment, the nickel-based catalyst further includes a catalyst promoter selected from the group consisting of platinum, palladium, rhodium, copper, chromium, manganese, and cobalt.

In another embodiment of the invention, a catalyst is provided for reducing carbon monoxide, hydrocarbon emissions, and nitrogen oxides from a vehicle exhaust which comprises from about 2 to 20 wt % nickel loaded onto a carrier, where the carrier is non-reactive with nickel.

In yet another embodiment of the invention, a vehicle exhaust gas treatment system is provided comprising a nickel-based catalyst positioned in the exhaust passage of a vehicle, where the catalyst is deposited directly onto a carrier which is non-reactive with nickel.

In one embodiment, the exhaust gas treatment system further includes a three-way catalyst on the nickel-based catalyst. In another embodiment, the treatment system further includes a close-coupled catalyst, where the nickel-based catalyst is positioned downstream from the close-coupled catalyst.

In another embodiment, exhaust gas treatment system further includes an underbody catalyst, where the nickel-based catalyst is positioned upstream from the underbody catalyst.

In another embodiment, the exhaust gas treatment system includes a close-coupled catalyst and an underbody catalyst positioned downstream from the close-coupled catalyst, wherein the nickel-based catalyst is positioned downstream from the underbody catalyst.

In yet another embodiment of the invention, a method of providing a nickel catalyst on a carrier is provided which includes providing a carrier selected from zirconium oxide, cordierite, silicon carbide, or silica gel, and impregnating the carrier with a nickel solution selected from nickel nitrate, nickel acetate, nickel carbonate, nickel sulfate, and combinations thereof.

The method may further include providing a three-way catalyst (TWC) washcoat over the nickel catalyst. The TWC washcoat preferably includes a precious metal selected from the group consisting of platinum, palladium, or rhodium. The TWC washcoat may further include a catalyst promoter selected from the group consisting of zirconium oxide, cerium oxide, aluminum oxide, praseodymium, lanthanum oxide, and barium oxide.

The method may further include impregnating the substrate with a solution containing a precious metal selected from the group consisting of platinum, palladium, or rhodium.

In another embodiment of the invention, a method for treating engine exhaust gases is provided which comprises providing a nickel-based catalyst in an exhaust passage of an engine comprising a nickel-based catalyst deposited directly onto a carrier which is non-reactive with nickel, and exposing the catalyst to engine exhaust gas emissions containing carbon monoxide (CO), hydrocarbons (HC) and $NO_x$ such that at least a portion of the emissions are converted to $CO_2$, $H_2O$ and $N_2$ at a temperature between about 200° C. to 1000° C.

When the engine exhaust gas is subjected to a rich cycle, the catalyst provides a CO and HC conversion efficiency of at least 50% at a temperature between about 200° C. to about 1000° C.

When the engine exhaust gas is subjected to a lean cycle, the catalyst provides a $NO_x$ conversion efficiency of at least 60% at a temperature between about 200° C. to about 1000° C.

Preferably, the nickel-based catalyst provides a supplemental oxygen storage capacity of about 2 mole O to about 50 mole $O/ft^3$.

Accordingly, it is a feature of embodiments of the invention to provide a nickel-based catalyst which provides supplemental oxygen capacity for use in reducing carbon monoxide, hydrocarbon emissions, and nitrogen oxides from a vehicle exhaust. It is another feature of the invention to provide a nickel-based catalyst which provides further removal of carbon monoxide and hydrocarbons via catalyzation of a water-gas-shift (WGS) reaction or steam-reforming reaction.

Other features and advantages of the invention will be apparent from the following description, the accompanying drawings, and the appended claims.

DETAILED DESCRIPTION OF THE PREFERRED EMBODIMENTS

The use of nickel-based catalysts for reducing vehicle exhaust emissions provides an advantage over other catalysts such as conventional three-way catalysts (TWC) as they can provide a larger oxygen-storage-capacity (OSC) and they exhibit higher CO and HC conversion efficiency during rich air/fuel excursions.

In addition, the nickel-based catalyst provides removal of carbon monoxide and hydrocarbons via catalytic water-gas-shift (WGS) and steam-reforming operations after the depletion of oxygen storage capacity. For example, during extended rich conditions when the OSC is depleted, the nickel-based catalyst can catalyze the reaction of water with carbon monoxide (via WGS reaction) or the reaction of water with hydrocarbons (steam-reforming) to form carbon dioxide and hydrogen in the engine exhaust.

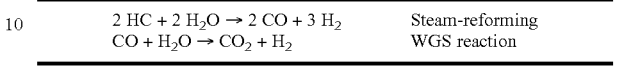

| $2 HC + 2 H_2O \rightarrow 2 CO + 3 H_2$ | Steam-reforming |
| $CO + H_2O \rightarrow CO_2 + H_2$ | WGS reaction |

Theoretically, 1 g of nickel (59 g/mole) can provide $16.9 \times 10^{-3}$ mole oxygen. In practice, nickel has been shown to go through complete reduction and oxidation between Ni and NiO at 350° C. or above. Thus, the available amount of oxygen available per gram of nickel can be up to one order of magnitude larger than the available amount of oxygen from OSC materials such as cerium, which has a maximum amount of $3.6 \times 10^{-3}$ mole oxygen per 1 g (140 g/mole).

In addition, by utilizing nickel on a carrier which contains no materials which are reactive with nickel, there is no potential negative interaction between nickel and reactive materials such as alumina. This is an improvement over prior TWC washcoats which contain alumina and are impregnated with nickel. It is known that nickel reacts with alumina to form nickel-aluminate. While not wishing to be bound by theory, it is believed that the deactivation of current commercial Ni-loaded three-way catalysts which occurs during aging is attributed to the formation of nickel-aluminate.

Thus, by using a nickel-based catalyst on a carrier which is free of reactive alumina or other reactive components, degradation of nickel is minimal during vehicle aging. In embodiments where the nickel-based catalyst is used in combination with a TWC washcoat, the washcoat materials are also free of reactive components such as alumina such that negative interaction is avoided between nickel and other components in the TWC washcoat materials during vehicle aging which could compromise the TWC function.

Figure 1:
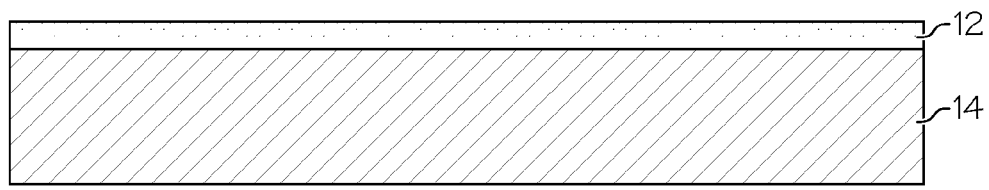
FIG. 1 is a schematic illustration of a catalyst including nickel impregnated on a carrier surface in accordance with an embodiment of the invention.
Figure 2:
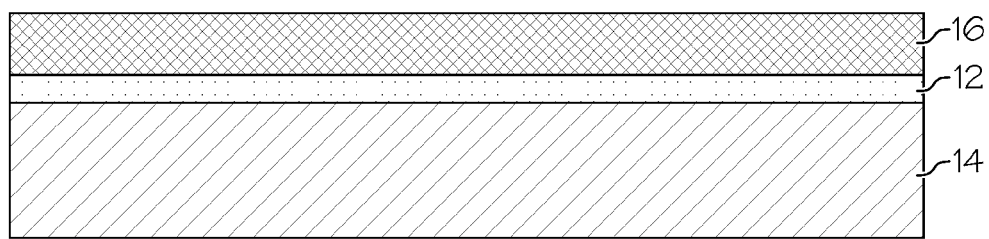
FIG. 2 is a schematic illustration of a nickel-based catalyst on a carrier including a TWC washcoat layer in accordance with another embodiment of the invention.

Referring now to FIGS. 1 and 2, embodiments of the catalyst 10 are shown. As shown in FIG. 1, nickel 12 is loaded on a carrier surface 14. Suitable carriers for use include cordierite, zirconium oxide, cordierite, silicon carbide, or silica gel. The nickel may be loaded onto the carrier by preparing a nickel solution of about 0.05 to 0.30 g Ni/g-solution, and preferably from about 0.105 g Ni/g-solution. The nickel solution may comprise nickel nitrate, nickel acetate, nickel carbonate, nickel sulfate, or combinations thereof.

The nickel solution may be impregnated directly into the carrier which is provided in the form of a honeycomb substrate, or alternatively, the nickel solution may be impregnated on powders that are washcoated onto a honeycomb substrate.

The nickel-impregnated carrier is dried and calcined prior to use. The impregnated carrier substrate is preferably dried at a temperature between about 100° C. and 250° C. for about 1 hour and is then calcined at a temperature of between about 350° C. and 650° C. for 1 hour. The total amount of nickel can be loaded in one step or by repeating the impregnation/drying/calcining steps.

In order to enhance the properties of the nickel, promoters may be added to the nickel-impregnated carrier. Suitable promoters include platinum, palladium, rhodium, copper, chromium, manganese, and cobalt. The promoters may be added to the nickel-impregnated carrier in solution by wet impregnation.

Referring now to FIG. 2, a catalyst 10 is shown which includes nickel layer 12 loaded on a carrier surface 14, and a three-way catalyst (TWC) layer 16 on the nickel layer 12. The TWC catalyst may be provided as a conventional washcoat containing precious metals such as platinum, palladium, or rhodium. The washcoat may further include oxide supports and promoters such as zirconium oxide, cerium oxide, aluminum oxide, praseodymium oxide, lanthanum oxide, and barium oxide. It should be noted that while the TWC washcoat may contain aluminum oxide, this is not believe to be detrimental to the nickel catalyst as long as the TWC comprises a separate layer and is not in direct contact with the nickel catalyst layer. The TWC catalyst is preferably applied at a loading of about 1400 to 5500 $g/ft^3$.

Optionally, an additional layer of a porous washcoat material may be included between the nickel layer and the TWC layer (not shown) in order to prevent a possible negative interaction between the nickel-containing layer and the TWC layer. Suitable washcoat materials include, but are not limited to, titanium oxide, zirconium oxide, or cerium oxide. This washcoat material may be coated at about 500 to 2000 $g/ft^3$.

Figure 3:
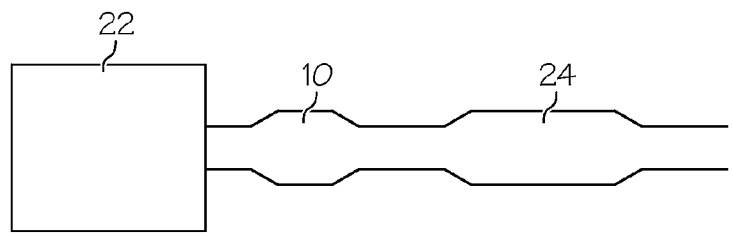
FIG. 3 is a schematic illustration of a nickel-based catalyst positioned in an exhaust treatment system in accordance with an embodiment of the invention.
Figure 4:
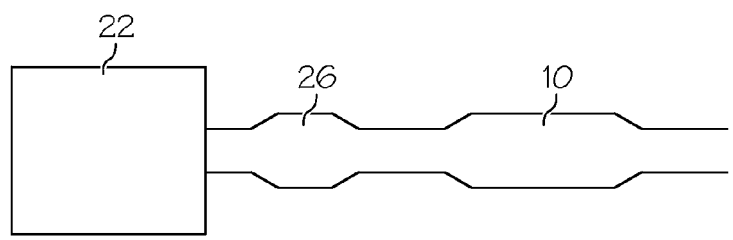
FIG. 4 is a schematic illustration of a nickel-based catalyst positioned in an exhaust treatment system in accordance with another embodiment of the invention.
Figure 5:
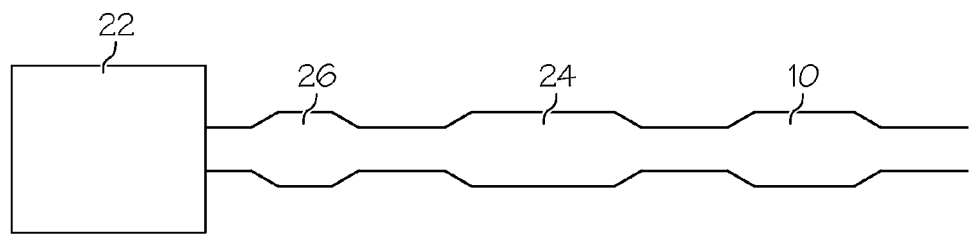
FIG. 5 is a schematic illustration of a nickel-based catalyst positioned in an exhaust treatment system in accordance with another embodiment of the invention.

Referring now to FIGS. 3-5, embodiments of the exhaust gas treatment system 20 are illustrated. It should be appreciated that the specific location of the nickel-based catalyst in the exhaust gas may vary according to the target catalyst temperature during vehicle operation. As shown in FIG. 3, the exhaust treatment system 20 is coupled to an exhaust manifold 22 of a gasoline engine and includes the nickel-based catalyst 10 positioned upstream from an underbody catalyst 24. The underbody catalyst may comprise a conventional TWC which may contain precious metals such as platinum, palladium, or rhodium. The TWC washcoat may further include oxide supports and promoters such as zirconium oxide, cerium oxide, aluminum oxide, praseodymium oxide, lanthanum oxide, and barium oxide.

Where the nickel-based catalyst is positioned upstream from the underbody catalyst as shown, it is in a higher operating temperature range, enabling faster activation of oxidation and reduction reactions, including steam reforming and water-gas shift. The nickel-based catalyst will be more active in this position when vehicle operating conditions generate lower exhaust gas temperature.

As shown in FIG. 4, the exhaust gas treatment system 20 includes nickel-based catalyst 10 positioned downstream from a close-coupled catalyst 26. By "close-coupled catalyst", it is meant a catalyst which is mounted immediately after the exhaust manifold. The close-coupled catalyst may contain a conventional washcoat composition similar to that of the underbody catalyst, but is configured for the removal of carbon monoxide, hydrocarbons, or nitrogen oxides at low light-off temperatures during the cold-start of a vehicle. The closed-coupled catalyst may also contain a higher loading of precious metals than the underbody catalyst.

When placed downstream from the close-coupled catalyst as shown, the nickel-based catalyst functions to perform oxidation and reduction as well as water-gas shift and steam reforming.

As shown in FIG. 5, the exhaust gas treatment system 20 includes a close-coupled catalyst 26, an underbody catalyst 24, and nickel-based catalyst 10 positioned downstream from catalysts 26 and 24. In this position, the nickel-based catalyst functions at a relatively low operating temperature, increasing the conversion of carbon monoxide via the water-gas shift reaction.

During operation, as exhaust gas generated by the vehicle engine passes through the exhaust gas manifold 22, it passes through the nickel-based catalyst 10 such that conversion of unburned HC and CO occurs. The conversion of $NO_x$ also occurs, especially when the vehicle operation is undergoing a rich-to-lean transition. The conversions are also aided by the close-coupled catalyst 26 or underbody catalyst 24 having conventional TWC functions. The nickel-based catalyst enhances the efficiencies of these conversions by providing a larger OSC capacity than a conventional TWC catalyst and providing catalytic activity for further removal of carbon monoxide or hydrocarbons via WGS and steam-reforming reactions, especially under oxygen-deficient conditions for an engine exhaust. These reactions are shown below:

| | |
|---|---|
| $2 CO + O_2 \rightarrow 2 CO_2$ | $O_2$ from engine exhaust or OSC |
| $4HC + 3O_2 \rightarrow 2 CO_2 + 2 H_2O$ | $O_2$ from engine exhaust or OSC |
| $2 NO + 2 Ni \rightarrow N_2 + 2 NiO$ | NO being reduced to oxidize Ni |
| $2 HC + 2 H_2O \rightarrow CO + 3 H_2$ | Steam-reforming reaction |
| $CO + H_2O \rightarrow CO_2 + H_2$ | WGS reaction |

In order that the invention may be more readily understood, reference is made to the following examples which are intended to illustrate embodiments of the invention, but not limit the scope thereof.

EXAMPLE 1

Samples with various Ni loadings on a cordierite carrier were prepared. A 2.15 g of nickel nitrate solution with 0.1013 g Ni/g-solution was prepared and impregnated into a 4.53 g cordierite substrate having a honeycomb structure of 1 inch×1 inch. The impregnated sample was then dried at 150° C. for 1 hour and calcined at 350° C. in air for one hour prior to use. The resulting substrate contained 4.6 wt % Ni. The OSC values for the sample were measured shortly after preparation by placing the sample in a quartz reactor with helium flowing through the reactor, followed by the addition of CO into the helium flow. The consumption of CO or the production of $CO_2$ from the reaction of CO to oxygen contained in the OSC-bearing catalyst was monitored using a quadruple mass spectrometer. The OSC values are shown in Table 1 below.

TABLE 1

| OSC values for 4.6 wt % Ni on cordierite of 1" L x 1" D | | | |
|---|---|---|---|
| | OSC (mole O) measured at ° C. | | |
| Theoretical OSC | 400° C. | 600° C. | 700° C. |
| $3.73 \times 10^{-3}$ mole O | $3.86 \times 10^{-3}$ | $3.81 \times 10^{-3}$ | $3.86 \times 10^{-3}$ |

As can be seen, the measured OSC values are close to the theoretical value of the oxygen amount from the nickel loading.

EXAMPLE 2

A commercial catalyst containing 5 wt % nickel was prepared and subjected to a simulated aging process mimicking 4,000 (4K) or 120,000 (120K) vehicle miles. The samples were aged on a pulse-flame combustor (pulsator) using a Ford standard 4-mode aging cycle (the pulsator combusts fuel to generate a simulated vehicle exhaust). The samples were placed in the pulsator exhaust gas stream and subjected to cyclic air-fuel conditions at an exponentially weighted temperature of 930° C. in order to accelerate the aging process. The 4K samples were aged for 8 hours and the 120K samples were aged for 120 hours.

The OSC value of the commercial catalyst was determined using a gasoline flame-combustor (pulsator). These values were compared to catalysts prepared as described below containing 1) 12 wt % Ni on cordierite and 2) 12 wt % Ni and 1.7 wt % Pt.

Sample 1 was prepared by impregnating a substrate of 4.53 g cordierite (1"L×1"D) with 2.15 g of Ni solution with 0.1013 g Ni/g-solution. After calcination, the substrate was impregnated again with the same amount and concentration of Ni solution. After calcination, the same step was repeated for the sample. After the three impregnation steps, the final sample contained 12.6 wt % Ni.

Sample 2 was prepared by adding 1.7 wt % Pt to a catalyst of 12 wt % by a wet-impregnation process using 0.85 g solution of $5.476 \times 10^{-2}$ Pt/g-solution to 11.73 wt % Ni on cordierite prepared as described above.

The samples were aged as described above and the OSC values were measured after aging as shown in Table 2.

TABLE 2

OSC values for a commercial TWC catalyst with 5 wt % Ni and the 12.2 wt % Ni on cordierite, fresh or after simulated 120k-mile aging on a gasoline flame-combustor

| Catalyst Sample | Simulated 4K-mile aged: OSC ($\times 10^{-3}$ mol O) measured at 750° C. | Simulated 120K-mile aged: OSC ($\times 10^{-3}$ mol O) measured at 750° C. | Simulated 120K-mile aged: OSC ($\times 10^{-3}$ mol O/gm Ni) at 750° C. |
|---|---|---|---|
| Commercial TWC + 5 wt % Ni in washcoat | 0.85 | 0.224 | 1.2 |
| 12.2 wt % Ni on cordierite | | 2.16 | 6.8 |
| 12 wt % Ni + 1.7% Pt on cordierite | 2.97 | 1.9 | 6.1 |

As shown, the Ni impregnated on cordierite samples exhibited better OSC properties than the commercial catalysts with nickel directly applied into the catalyst washcoat, i.e., 6.8 or $6.1 \times 10^{-3}$ mol O/gm-Ni vs. $1.2 \times 10^{-3}$ mol O/gm-Ni after 120K aging. The data also shows a greater fractional loss of OSC with aging for the conventional TWC containing Ni compared with the Ni-impregnated cordierite sample (73% and 36%, respectively). The deactivation of the commercial Ni-loaded three-way catalyst after simulated aging can be contributed to the formation of nickel-aluminate.

EXAMPLE 3

A catalyst was prepared by washcoating alumina onto a cordierite substrate and then impregnating the alumina/cordierite with nickel. The process of loading nickel was the same as that described in Example 1. The catalyst of nickel on alumina/cordierite the two samples of nickel on cordierite were aged under alternative flows of 1% CO and 0.5% $O_2$ at 1000° C. (redox-aging) for 12 hours, simulating the rich-lean cycles of gasoline engine exhausts. The OSC values after the redox-aging are shown in Table 3.

TABLE 3

OSC after the redox-aging at 1000° C. over 1' L × 1" D samples: alumina effect

| | | OSC ($\times 10^{-3}$ mole O) measured at T = | |
|---|---|---|---|
| Ni loading | Support | 600° C. | 700° C. |
| 13.8 wt % | alumina/cordierite | 0.63 | 0.76 |
| 8.95 wt % | cordierite | 3.04 | 5.10 |
| 12.6 wt % | cordierite | 4.75 | 7.96 |

As can be seen, the OSC values for nickel on alumina/cordierite after aging were dramatically diminished in comparison with those for the sample of nickel on cordierite. It is believed that the nickel-alumina interaction caused the severe deactivation.

EXAMPLE 4

Commercial TWC catalysts were prepared as described in Example 2 by washcoating alumina onto a cordierite substrate and then impregnating the alumina/cordierite with 5 wt % nickel and 1 wt % nickel. The commercial catalysts were subjected to simulated 120 k-mile aging along with a nickel-based catalyst prepared according to Example 2 containing 12 wt % nickel on cordierite. The CO conversion efficiency of the catalysts was then tested under rich conditions with 5% CO of the catalyst as shown in Table 4. A pulsator was used to test the CO conversion efficiency of the samples listed in Table 4. A fuel-rich exhaust environment was used to generate 5% excess CO in the exhaust gas stream, flowing at 4 liter/min. (LPM). The conversion efficiency of CO over the reduced catalyst samples was measured at 750° C. inlet gas temperature.

TABLE 4

CO conversions under rich conditions with 5% CO over catalysts (1" L × 3/4" D) after simulated 120k-mile aging

| Catalyst | Temperature | CO conversion |
|---|---|---|
| 12 wt % Ni on cordierite | 750° C. | 26% |
| Commercial TWC with 5 wt % Ni | 750° C. | 4.0% |
| Commercial TWC with 1 wt % Ni | 750° C. | 0.0% |

As can be seen, the sample of nickel on cordierite prepared in accordance with the invention shows a much higher efficiency for CO conversion than the commercial TWC catalysts.

Lambda sweep tests using a gasoline flame-combustor (pulsator) were also performed in order to measure the activity of the TWCs. The lambda sweep data showed the average HC, CO, or $NO_x$ conversion efficiency of the catalysts from a lambda value of 0.9975 to 1.0025 (near stoichiometry) at 750° C. The CO conversion over the commercial TWC with 5 wt % Ni is shown in Table 5 below and is lower than that of the commercial TWC with 1 wt % Ni. Again, it is believed that the addition of nickel to TWC catalysts has a negative impact on the TWC function due to the undesirable interaction of nickel with alumina contained in the washcoat. This is shown by the decrease in CO conversion efficiency from 99.4% to 98.2% when Ni was added to the washcoat of the baseline sample. In comparison, the addition of 10 wt % Ni directly on the cordierite substrate improved the CO conversion of a commercial TWC from 98.2% to 98.7% The CO conversion efficiency of the reduced samples shown in the last two columns of Table 5 was determined as described above for Table 4.

TABLE 5

Impact of Ni added to washcoat or onto cordierite on: TWC conversion performance, OSC, and WGS activity following simulated 120K vehicle-mile aging, on gasoline flame-combustor.

| Catalyst | 750° C. Average conversion efficiency from 0.9975-1.0025 lambda, lambda sweep test CO | OSC (× 10⁻³ mole O) 750° C. | CO conversion at .75 lambda (5.4% Feedgas CO) 750° C. | 500° C. |
|---|---|---|---|---|
| Baseline (1% Ni in washcoat) | 99.4% | 0.167 | 0.0% | 2.0% |
| Baseline + 4% Ni in washcoat (5% Ni) | 98.2% | 0.224 | 4.0% | 15.0% |
| Baseline-2 | 98.2% | 0.224 | 4.0% | 15.0% |
| Baseline-2 with 10% Ni impregnated cordierite | 98.7% | 0.67 | 21.0% | 49.0% |

The efficiency of CO conversion at 0.75 lambda, representing extremely rich conditions with 5.4% CO was measured at 500° C. and 750° C. The catalyst with 10 wt % Ni on cordierite showed a much larger CO efficiency than the conventional TWC with low or high Ni content (see Table 5). For the catalyst with 10 wt % Ni on cordierite, the CO efficiency at 500° C. was higher than at 750° C. This can be attributed to the excellent activity for water-gas-shift (WGS) reaction over the catalyst with 10 wt % Ni on cordierite: $CO + H_2O \leftrightarrow CO_2 + H_2$. The WGS reaction can contribute to the CO conversion, especially under extremely rich conditions. The catalyst with 10 wt % Ni clearly showed a higher activity for WGS reaction than the conventional TWC after aging. As the thermodynamics of a WGS reaction favors the lower temperature, the CO conversion via WGS reaction at 500° C. should be larger than that at 750° C.

Figure 6:
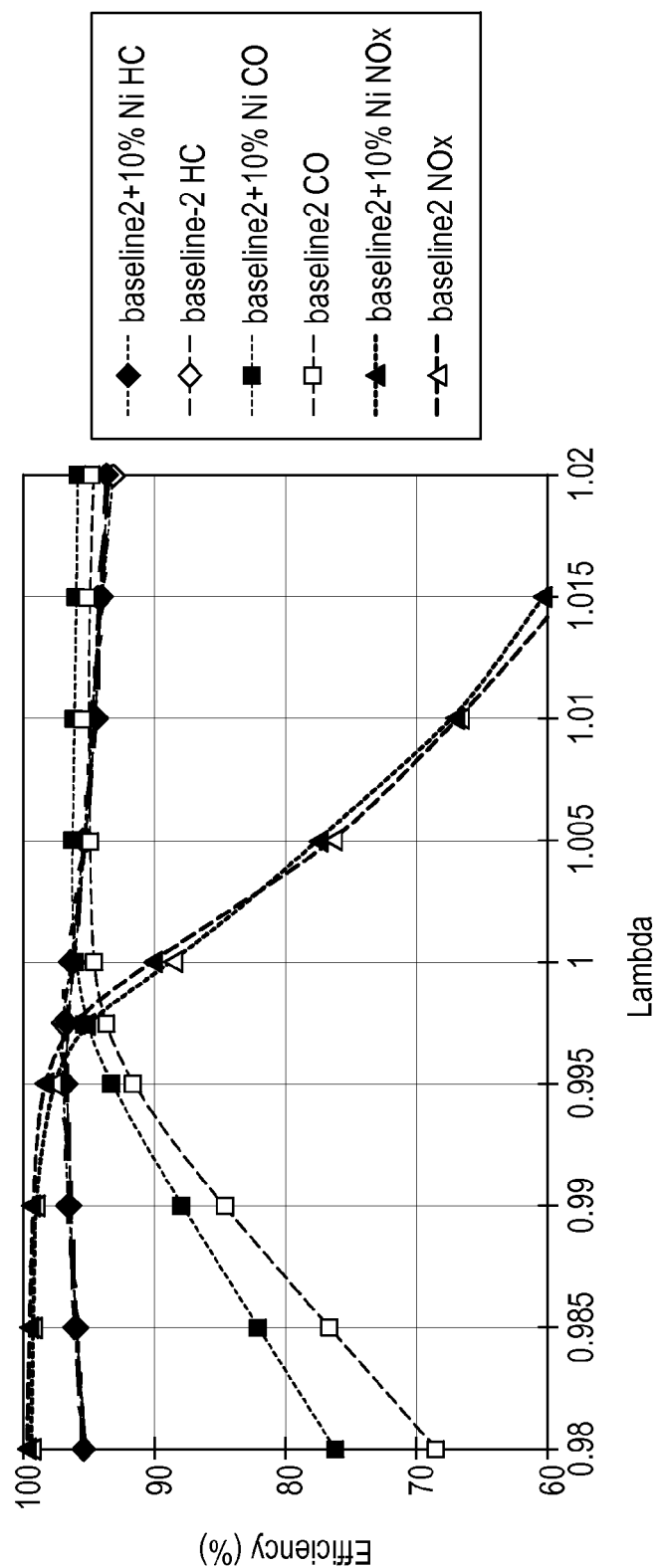
FIG. 6 is a graph illustrating the conversion efficiency of a catalyst with and without the presence of nickel.

A pulsator was used to test the conversion efficiency of the various samples as a function of lambda (actual air-fuel ratio/stoichiometric air-fuel ratio) at a space velocity of 35000/hour. FIG. 6 shows the HC, CO, and $NO_x$ conversion efficiencies as a function of lambda, with or without 10% Ni added to cordierite at 500° C. As can be seen, the addition of Ni onto cordierite increases the CO and $NO_x$ lambda operating window of the TWC. The Ni-based catalyst showed enhanced conversion activities over the conventional TWC with or without Ni. The enhancement in conversion for the Ni-based catalyst is believed to be the combination of the large OSC, and excellent activities for the WGS reaction and steam reforming reaction over the Ni catalyst.

EXAMPLE 5

Figure 7:
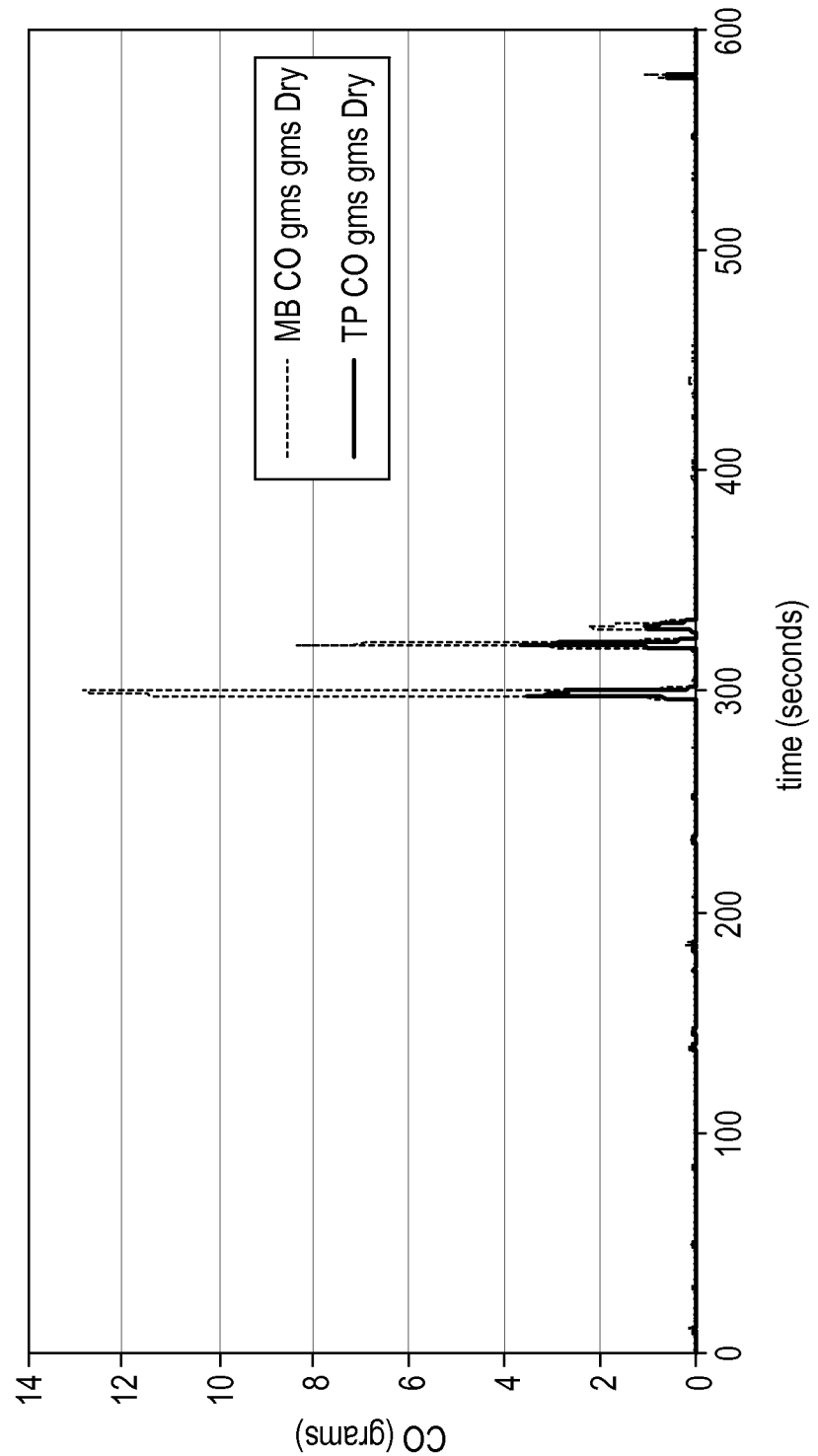
FIG. 7 is a graph illustrating the reduction of CO in an engine exhaust using a nickel-based catalyst.
Figure 8:
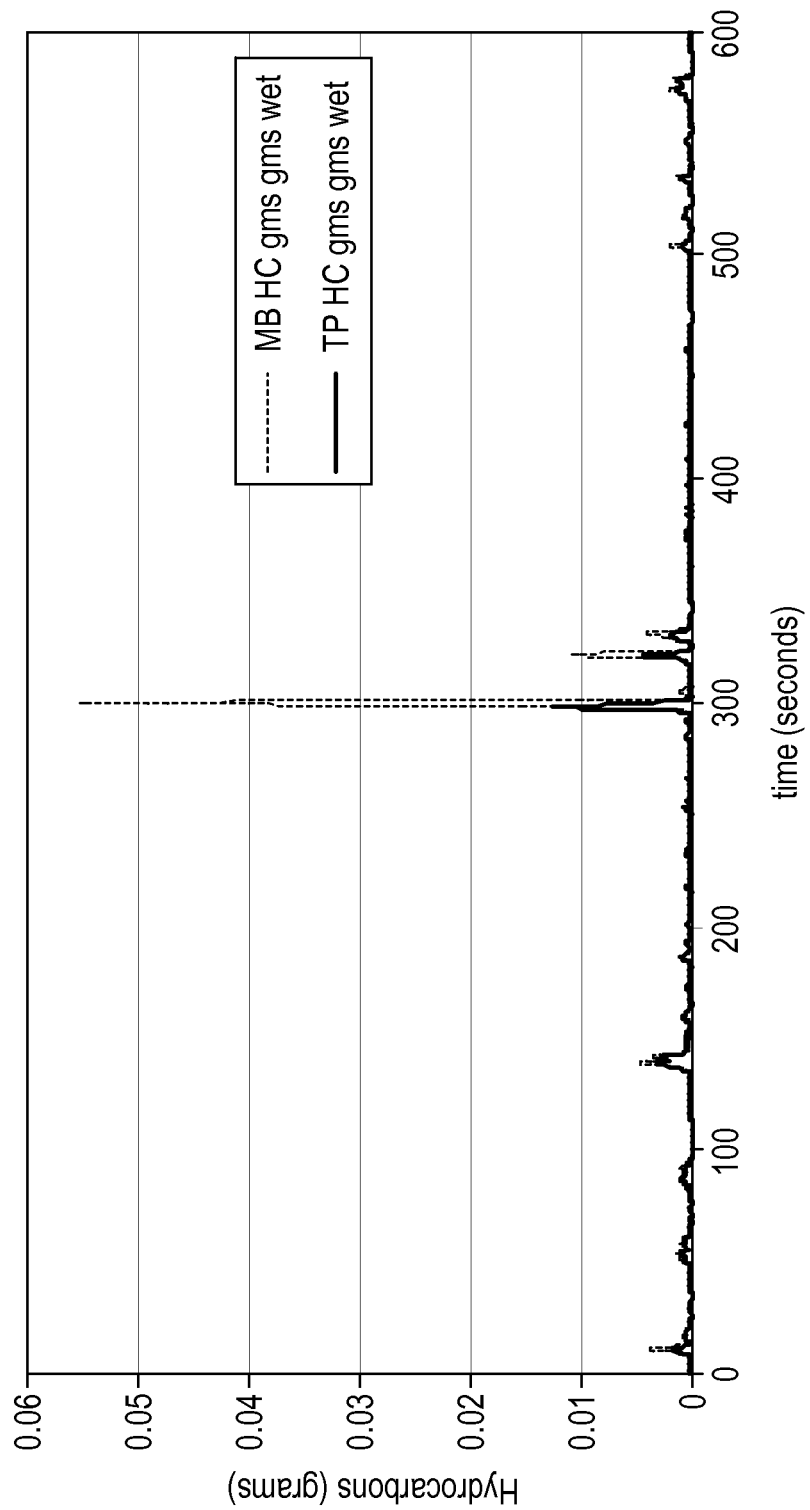
FIG. 8 is a graph illustrating the reduction of HC in an engine exhaust using a nickel-based catalyst.
Figure 9:
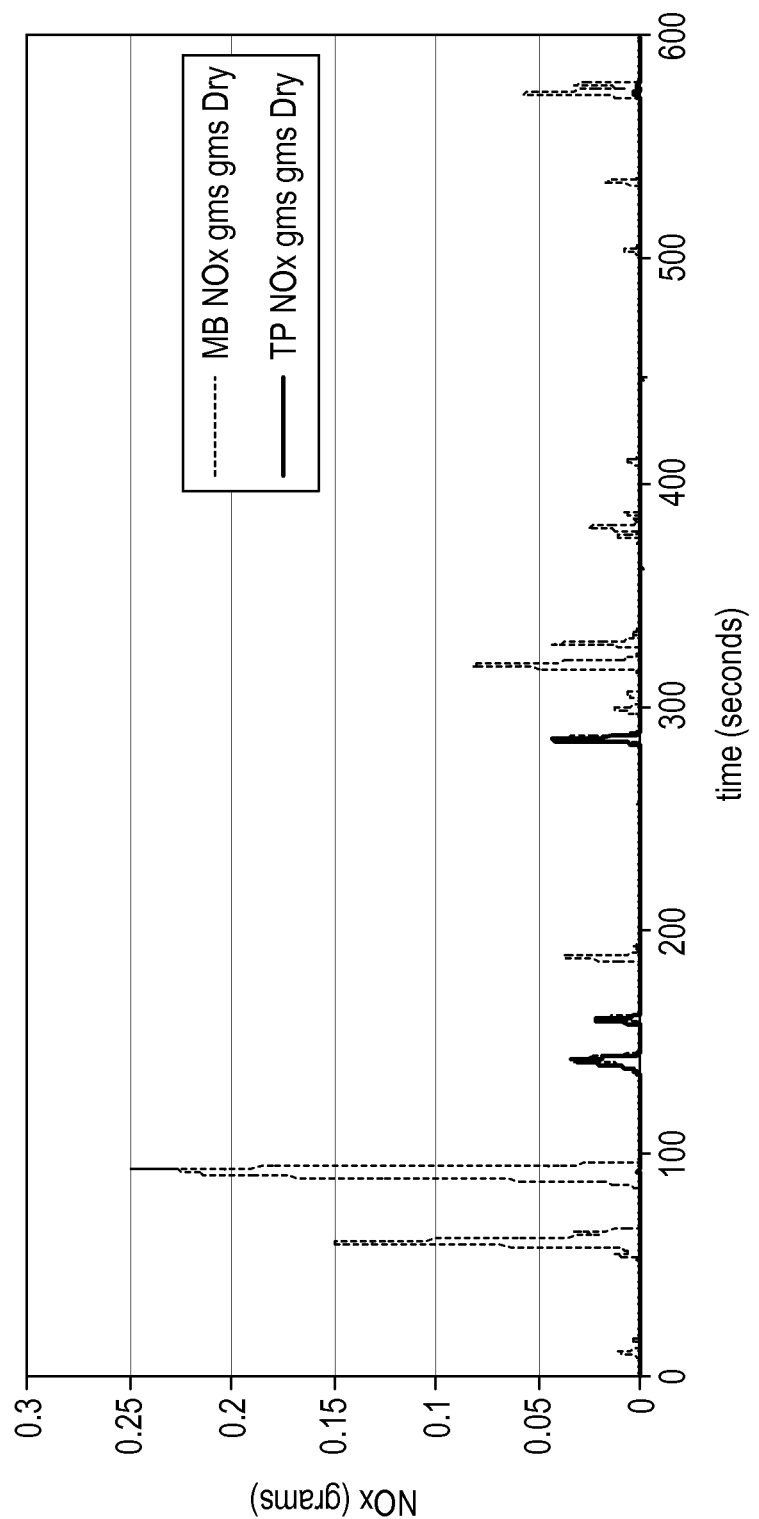
FIG. 9 is a graph illustrating the reduction of $NO_x$ in an engine exhaust using a nickel-based catalyst.

Nickel-based catalysts prepared in accordance with an embodiment of the invention were positioned downstream of a close-coupled catalyst in an engine exhaust. The emissions from the nickel-based catalyst were measured on a vehicle during a US06 drive cycle run on a chassis dynamometer. The US06 drive cycle is a test cycle that is used to represent highway driving where the vehicle operates at higher speed and load conditions than those which are typical of less aggressive drive cycles. The reduction of CO, HC, and $NO_x$ during the vehicle US06 test cycle is shown in FIGS. 7, 8 and 9, respectively. The total grams/mile emissions during the test cycle is summarized in Table 6 below.

TABLE 6

| US06 emissions (g/mile) | total HC | CO | NOx |
|---|---|---|---|
| Before Ni-based catalyst | 0.04 | 9.2 | 0.38 |
| After Ni-based catalyst | 0.02 | 3.6 | 0.03 |

Having described the invention in detail and by reference to preferred embodiments thereof, it will be apparent that modifications and variations are possible without departing from the scope of the invention.

What is claimed is:

1. A catalyst for reducing carbon monoxide, hydrocarbon emissions, and nitrogen oxides from a vehicle exhaust comprising:
   a nickel-based catalyst comprising nickel deposited directly onto a carrier, wherein said carrier is non-reactive with nickel.

2. The catalyst of claim 1 wherein said carrier comprises a material selected from the group consisting of zirconium oxide, cordierite, silicon carbide, silica gel, or non-reactive alumina.

3. The catalyst of claim 2 wherein said carrier is in the form of a honeycomb substrate.

4. The catalyst of claim 2 wherein said carrier is in the form of a powder which has been washcoated onto a honeycomb substrate.

5. The catalyst of claim 1 wherein said nickel-based catalyst is contained on said carrier at a loading of between about 2 to about 20 wt %.

6. The catalyst of claim 1 wherein said nickel-based catalyst is contained on said carrier at a loading of between about 8 to about 15 wt %.

7. The catalyst of claim 1 further including a three-way catalyst provided as a separate layer over said nickel-based catalyst.

8. The catalyst of claim 7 wherein said three-way catalyst includes a precious metal selected from the group consisting of platinum, palladium, or rhodium.

9. The catalyst of claim 7 wherein said three-way catalyst includes a catalyst promoter selected from zirconium oxide, cerium oxide, aluminum oxide, praseodymium oxide, lanthanum oxide, and barium oxide.

10. The catalyst of claim 1 wherein said nickel-based catalyst includes a catalyst promoter selected from the group consisting of platinum, palladium, rhodium, copper, chromium, manganese, and cobalt.

11. A catalyst for reducing carbon monoxide, hydrocarbon emissions and nitrogen oxides from a vehicle exhaust comprising:
   from about 2 to 20 wt % nickel loaded directly onto a carrier, wherein said carrier is non-reactive with nickel.

12. A vehicle exhaust gas treatment system comprising:
   a nickel-based catalyst positioned in the exhaust passage of a vehicle; said catalyst impregnated directly onto a carrier, wherein said carrier is non-reactive with nickel.

13. The treatment system of claim 12 further including a three-way catalyst coating on said nickel-based catalyst.

14. The treatment system of claim 12 including a close-coupled catalyst, wherein said nickel-based catalyst is positioned downstream from said close-coupled catalyst.

15. The treatment system of claim 12 including an underbody catalyst, wherein said nickel-based catalyst is positioned upstream from said underbody catalyst.

16. The treatment system of claim 12 further including a close-coupled catalyst and an underbody catalyst positioned downstream from said close-coupled catalyst, wherein said nickel-based catalyst is positioned downstream from said underbody catalyst.

17. A method of providing a nickel catalyst on a carrier substrate comprising:
providing a carrier substrate selected from zirconium oxide, cordierite, silicon carbide, or silica gel; and
directly impregnating said carrier substrate with a nickel solution selected from nickel nitrate, nickel acetate, nickel carbonate, nickel sulfate, and combinations thereof.

18. The method of claim 17 further including providing a TWC washcoat over said nickel catalyst.

19. The method of claim 18 wherein said TWC washcoat includes a precious metal selected from the group consisting of platinum, palladium, or rhodium.

20. The method of claim 18 wherein said TWC washcoat includes a catalyst promoter selected from the group consisting of zirconium oxide, cerium oxide, aluminum oxide, praseodymium, lanthanum oxide, and barium oxide.

21. The method of claim 17 including impregnating said substrate with a solution containing a precious metal selected from the group consisting of platinum, palladium, or rhodium.

22. A method for treating engine exhaust gases comprising:
providing a nickel-based catalyst in an exhaust passage of an engine, said catalyst impregnated directly onto a carrier, wherein said carrier is non-reactive with nickel;
exposing said catalyst to engine exhaust gas emissions containing carbon monoxide (CO), hydrocarbons (HC) and $NO_x$ such that at least a portion of said emissions are converted to $CO_2$, $H_2O$ and $N_2$ at a temperature between about 200° C. to 1000° C.

23. The method of claim 22 wherein when said engine exhaust gas is subjected to a rich cycle, said catalyst provides a CO and HC conversion efficiency of at least 50% at a temperature between about 200° C. to about 1000° C.

24. The method of claim 22 wherein when said engine exhaust gas is subjected to a lean cycle, said catalyst provides a $NO_x$ conversion efficiency of at least 60% at a temperature between about 200° C. to about 1000° C.

25. The method of claim 22 wherein said catalyst provides a supplemental oxygen storage capacity of about 2 mole O to about 50 mole O per cubic feet.

\* \* \* \* \*